United States Patent [19]

Toudo

[11] Patent Number: 4,734,935
[45] Date of Patent: Mar. 29, 1988

[54] COMMUNICATION SYSTEM WITH REMOTELY CONTROLLABLE SIGNAL RECEIVING MEANS

[75] Inventor: Kentaro Toudo, Tokyo, Japan

[73] Assignee: NEC Corporation, Tokyo, Japan

[21] Appl. No.: 864,272

[22] Filed: May 19, 1986

[30] Foreign Application Priority Data

May 23, 1985 [JP] Japan .................................. 60-110739

[51] Int. Cl.[4] .......................... H04M 7/14; H04Q 3/58
[52] U.S. Cl. ..................................... 379/236; 379/234; 379/385
[58] Field of Search ............... 379/234, 236, 240, 385, 379/377, 332, 329, 284, 269; 370/68.1, 110.1

[56] References Cited

U.S. PATENT DOCUMENTS 4,563,547 1/1986 Booth .................................. 379/342
4,623,888 11/1986 Waring .............................. 340/826

FOREIGN PATENT DOCUMENTS 0182984 10/1983 Japan ................................... 379/236

Primary Examiner—Thomas W. Brown
Attorney, Agent, or Firm—Schwartz, Jeffery, Schwaab, Mack, Blumenthal & Evans

[57] ABSTRACT

A communication system having remotely controllable signal receiving means for automatically setting the receive function for a start-signal transmitted from a terminal device and for changing the receive function when the terminal device is changed. At start-up, a main processor reads start-signal type information for each of the terminal devices from a main memory. The line circuits associated with the respective terminal devices are then set with a start-signal receive function according to the start-signal type information. When a terminal device is added or changed, the start-signal receive function is changed by merely updating the start-signal type information stored in the main memory.

5 Claims, 5 Drawing Figures

COMMUNICATION SYSTEM WITH REMOTELY CONTROLLABLE SIGNAL RECEIVING MEANS

BACKGROUND OF THE INVENTION

This invention relates to a communication system and, more particularly, to a communication system having remotely controllable signal receiving means.

In a communication system such as an electronic switching system, a terminal device is generally accommodated in the system via a corresponding line circuit. When the terminal device originates a call, a start signal is inputted at the line circuit via a pair of communication lines. Such start signals are classified into two types: "a loop-start signal" which is transmitted to the line circuit through a closed loop formed in the communication lines and "a ground-start signal" which is transmitted to the line circuit through one of the pair of communication lines. The start signals are selectively used depending on the type of the terminal device. When the terminal device in an electronic switching system is a coin telephone set or a private branch exchange, the ground-start signal is used. When the terminal device is a regular telephone set, on the other hand, the loop-start signal is used. Such a line circuit is preferably constructed for general purpose to receive both types of start signals and detect a call originating from the terminal device.

In the prior art, a plurality of line circuits constructed for general purpose are packaged on a printed circuit board to meet the above requirement. The packaged line circuits are generally called a line circuit card or a line card. The line circuit card is provided with a signal receiving function by jumper wire connection on the board or by a manual switching operation on the board. The line circuit card is then inserted (mounted) at a predetermined location in communication equipment to satisfy a predetermined station design condition, that is, a type of a start signal used by a terminal device in an initial period of construction at a system installation place (a communication station).

However, since the function of receiving the start signal is manually provided to each of several thousand of the line circuits at the station by maintenance workers, the period required for the initial construction is long, and function setting errors inevitably occur, simultaneously. The opportunity for error increases when the function at each of the line circuits is changed due to changes in subscriptions at each terminal device. Moreover, even if the plurality of line circuits are provided within one packaged line circuit card and the function is to be changed only for a part of the line circuits, the line circuit card must be taken out from the system thereby inconveniently suspending the service temporarily at the terminal device served by the system.

SUMMARY OF THE INVENTION

An object of the present invention is, therefore, to provide a communication system with remotely controllable signal receiving means which is capable of automatically setting a receive function for a start signal from a terminal device and changing the receive function by installing at a predetermined location a circuit usable even if the type of the start signal from the terminal device is changed.

Another object of the invention is to provide a communication system with remotely controllable signal receiving means which is set with the start-signal receive function and whose receive function is changed by effectively using data stored for basic operation of the system.

Still another object of the invention is to provide a communication system with remotely controllable signal receiving means which is set with the start-signal receive function and whose receive function is changed without affecting a currently operating circuit.

According to one aspect of the invention, there is provided a communication system with remotely controllable signal receiving means, which includes first means whose start signal receive function is changed depending on the type of the start signal sent from a terminal device connected thereto via a communication line and which is arranged at one of plug-in and plug-out states. The communication system includes second means for storing type information about the start signal in a manner to be indexable with accommodation location information of the terminal device. The system includes third means for independently monitoring the plug-in and plug-out states of the first means and detecting a change in the states. The system also includes fourth means for controlling initial setting of the start signal receive function of the first means on the basis of the type information stored in the second means, receiving information on the change in the states of the first means from the third means, inhibiting communication service to the first means changed into the plug-out state, and controlling setting of the start signal receive function to the first means changed into the plug-in state.

BRIEF DESCRIPTION OF THE DRAWINGS

The above and other objects, features and advantages of the present invention may be fully understood from the following detailed description and the accompanying drawings, wherein.

In the drawings, identical reference numerals denote identical structural elements.

DESCRIPTION OF THE PREFERRED EMBODIMENT

Figure 1:
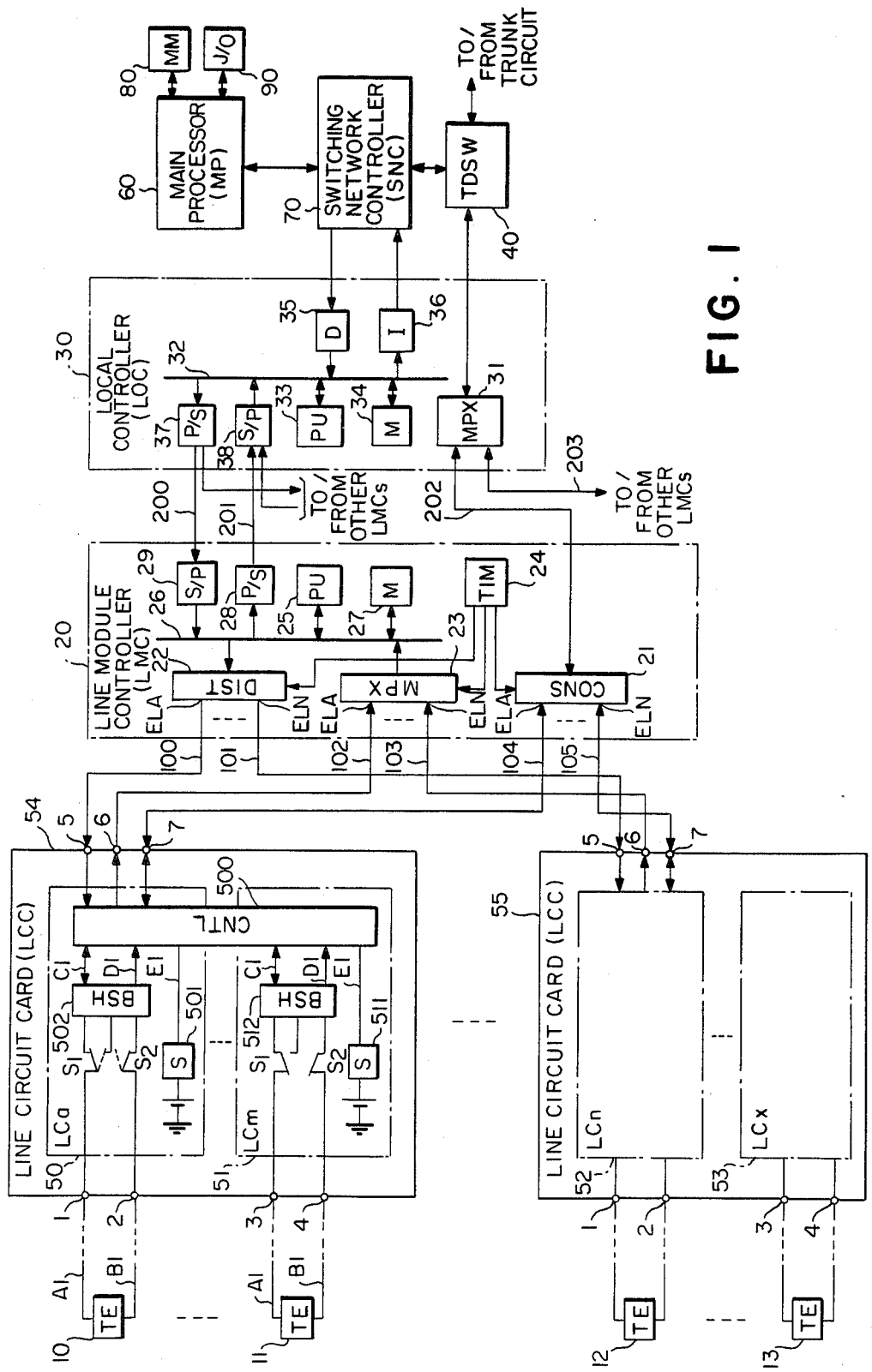
FIG. 1 is a schematic diagram showing an embodiment of the present invention.
Figure 3:
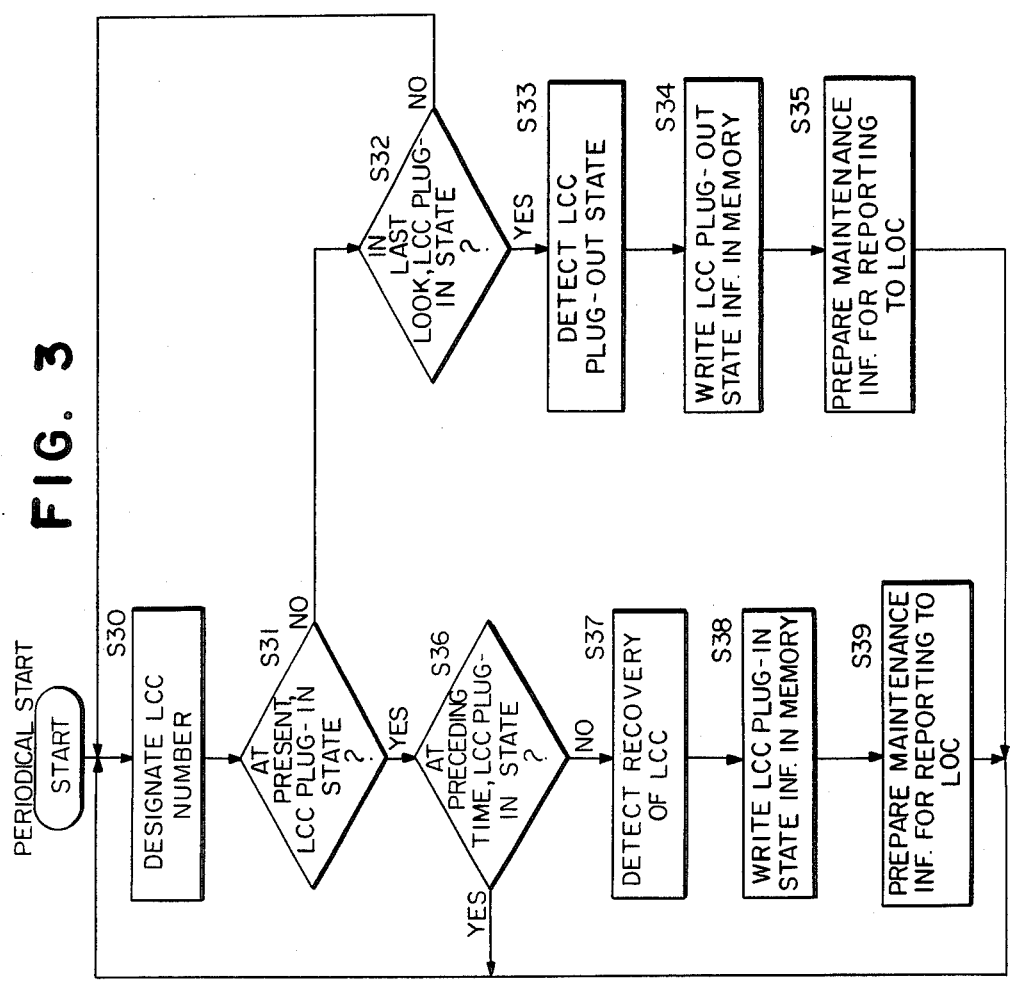
FIGS. 3, 4, and 5 are flow chart diagrams for describing the operation of the line module controller, local controller and main processor shown in FIG. 1.

Referring to FIG. 1, if terminal devices (TE) 10, 11, 12 and 13 wish to communicate with desired terminal devices, it is necessary to set communication paths, or communication channels, therebetween via a concentrator (CONS) 21 of a line module controller (LMC) 20, a multiplexer (MPX) 31 of a local controller (LOC) 30 and a switching network, or a time division switch (TDSW) 40. The terminal devices 10, 11, 12 and 13 are therefore accommodated respectively in the LMC 20 via line circuits (LCa, LCm, LCn and LCx) 50, 51, 52 and 53. The LCa 50 and LCm 51 are mounted on the same printed circuit board to form a line circuit card (LCC) 54 while the LCn 52 and LCx 53 are mounted on the other same printed circuit board to form a line circuit card (LCC) 55. The cards 54 and 55 are plugged into a mounting device (not shown) respectively with connection terminals 1 through 7. The LCa 50 and LCm 51 include respectively a control circuit (CNTL), a battery supply hybrid circuit (BSH), a switching device (S), and contacts S1 and S2 of the switching device. The LCm 51 and LCx 52 have an identical structure. The CNTL 500 functions to receive control information from the LMC 20, which will be described in more detail hereinafter, to drive the switching devices 501 and 511 on the basis of the received control information, to transmit maintenance information to the LMC 20 and to receive and transmit communication signals such as voice signals from and to the LMC 20. The BSH's 502 and 512 supply an electric current necessary for communication to the terminal devices 10 and 11, to switch between two-wire communication lines A1 and B1 and four-wire communication lines C1 and input start signals to the CNTL 500 via the lines D1 as maintenance information when the start signals are transmitted from the terminal devices 10 and 11 for originating calls, respectively.

However, the LCa 50, LCm 51, LCn 52 and LCx 53 are structured differently in the connection modes of the communication lines A1 and B1 to the BSH's 502 and 512 depending on the types of the start signals which are transmitted when the terminal devices 10, 11, 12 and 13 originate calls. As is obvious from the structure of the LCa 50 and LCm 51 which are shown typically in FIG. 1, the LCa 50 connects the communication line A1 alone to the BSH 502 via the first contact S1 of the switching device 501 since the terminal device 10 transmits the ground-start signal as the start signal. The LCm 51, on the other hand, connects the communication lines A1 and B1 to the BSH 512 via the first and second contacts S1 and S2 of the switching device 511 respectively since the terminal device 11 transmits the loop-start signal as the start signal. The CNTL 500 of the LCa 50 and LCm 51 and the CNTL (not shown) of the LCn 51 and LCx 53 are connected to a distributor (DIST) 22 and a multiplexer (MPX) 23 of the LMC 20 via information transmission lines 100, 101, 102 and 103 and to a concentrator (CONS) 21 via four-wire communication lines 104 and 105. The distributor 22 distributes the control information from a microprocessor (PU) 25 to the CNTL 500 of the LCC 54 and the CNTL of the LCC 55 in time division at a timing synchronized with gate signals from a timing circuit (TIM) 24. The multiplexer 23 receives maintenance information, which includes information for detecting state changes on the terminal devices, inputted from the LCa 50, LCm 51, LCn 52 and LCx 53 to a microprocessor 25 via an internal bus 26 at a timing in synchronism with gate signals given from the timing circuit 24. The concentrator 21 is given communication signals such as voice signals from the LCa 50, LCm 51, LCn 52 and LCx 53 to a multiplexer 31 of the LOC 30 at a timing synchronized with gate signals from the timing circuit 24. A memory circuit (M) 27 has a control table (not shown) which records whether the LCCs 54 and 55 under the control of the LMC 20 are in a plug-in (LCC connected to terminal device) or a plug-out (LCC not connected to terminal device) state and stores an operation control program for the LMC 20. The LMC 20 transmits to and receives control information and maintenance information from the LOC 30 of higher order via a parallel-serial converter (P/S) 28 and a serial-parallel converter (S/P) 29 connected to the internal bus 26.

The LOC 30 which is connected to the LMC 20 via information transmission lines 200 and 201 comprises a microprocessor (PU) 33, a memory circuit (M) 34, a dropper (D) 35, an inserter (I) 36, a parallel-serial converter (P/S) 37 and a serial-parallel converter (S/P) 38. It also includes a multiplexer (MPX) 31 which further multiplexes communication lines 202 and 203 from the LMC 20 and other LMC's (not shown) to connect the lines 202 and 203 with the TDSW 40. The LOC 30 receives with the microprocessor 33 control information sent from a main processor (MP) 60 of the higher order controller and transmits the control information to the LMC 20 which is under the control of the LOC 30 via the converter 37. The control information can be classified as the information for monitoring the plug-in and plug-out states of the LCC's 54 and 55, the information for setting start-signal receive functions of the LCa 50, LCm 51, LCn 52 and LCx 53 and the information for monitoring power supply failure at the LMC 20 and the LCa 50, LCm 51, LCn 52 and LCx 53. The LOC 30 also receives the maintenance information, that is, the plug-in and plug-out state information and power supply failure information on the LCC's 54 and 55, at the microprocessor 33 via the converter 38 and transmits the maintenance information to the main processor 60 via the inserter 36. The memory circuit 34 has a control table (not shown) which records whether each of the LMC's is normally operating or not.

A switching network controller (SNC) 70, on the basis of receiving the control information from the processor 60, sets a time division communication channel in the TDSW 40 for a terminal device which wishes to communicate. It also transfers various information between the processor 60 and the LOC 30 which operate asynchronously with each other. The processor 60 is a controller which supervises and controls the whole system.

The main memory circuit (MM) 80 stores programs and data which are necessary for the main processor 60 to control the whole system. In order to provide a communication channel of the TDSW 40 to the terminal device which desires the communication by controlling the SNC 70, the processor 60 must know the accommodation location in the system of the terminal devices 10, 11, 12 or 13 connected to the LCa 50, LCm 51, LCn 52 or LCx 53. As the terminal devices 10, 11, 12 and 13 in this embodiment use the communication channels of the TDSW 40 in time division if they wish to communicate, the terminals ELA and ELN of the concentrator 21 of the LMC 20 are the accommodation locations of the terminal devices 10, 11, 12 and 13 in the system. The accommodation locations ELA and ELN are distributed in time division to the LCa 50 and LCm 51 (the terminal devices 10 and 11) and the LCn 52 and LCx 53 (the terminal devices 12 and 13). The terminals ELA and ELN of the distributor 22 and the multiplexer 23 of the LMC 20 which receives from and transmits the maintenance information and the control information to the LCa 50, LCm 51, LCn 52 and LCx 53 via the information transmission lines 100, 101, 102 and 103 and are also the accommodation locations for the terminal devices 10, 11, 12 and 13 in the system. The main memory circuit 80 therefor has a subscriber data table 81 (FIG. 2), which can be indexed on the basis of information (accommodation location information) indicating the above accommodation locations, for the processor 60. The data table 81 stores the type information for the terminal devices 10, 11, 12 and 13. The type information is generally recorded at the table 81 of the main memory circuit 80 via the processor 60 from input-output equipment (I/O) 90 such as a keyboard by a system operating company before the communication station is opened or whenever a change becomes necessary.

The operation in the communication system of an embodiment of the invention will now be described by referring to FIGS. 1, 2, 3, 4 and 5. At the initial installation work before opening the station, the LCC's 54 and 55 are mounted at predetermined positions of communication equipment (not shown) and connected to the equipment via the connector terminals 1 through 7. Because the switching devices 501 and 511 are not actuated, the LCa 50, LCm 51, LCn 52 and LCx 53 in the LCC's 54 and 55 connect the communication lines A1 and B1 which are connected to the terminal devices 10, 11, 12 and 13 to the BSH's 502 and 512 via the contacts S1 and S2. This connection allows the control circuit 500 to receive the loop-start signal from the terminal devices 10, 11, 12 and 13 but not to receive the ground-start signal. The processor 60 therefore reads out the type information which has been stored at the data table 81 of the main memory circuit 80 after the processor 60 has completed all the initial settings for the system and then drives only the switching device of the circuit which receives the ground-start signal out of the line circuits 50, 51, 52 and 53 for initial setting of the start-signal receive function.

Figure 2:
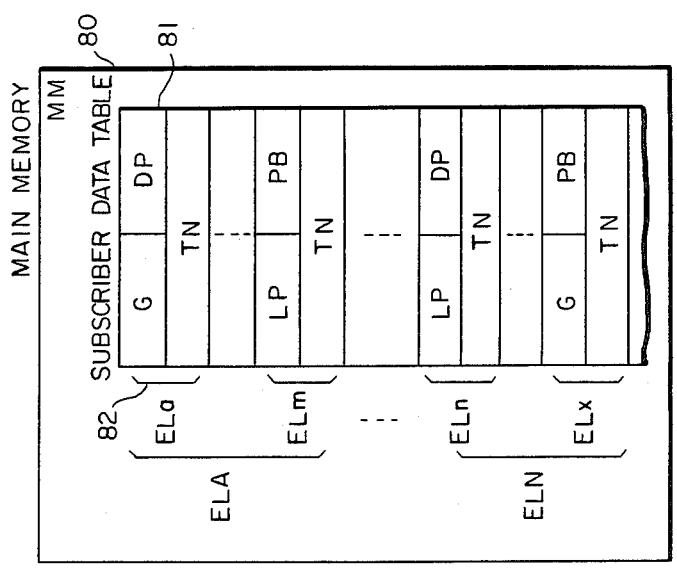
FIG. 2 is a diagram describing the subscriber data table of a main memory circuit shown in FIG. 1.
Figure 4:
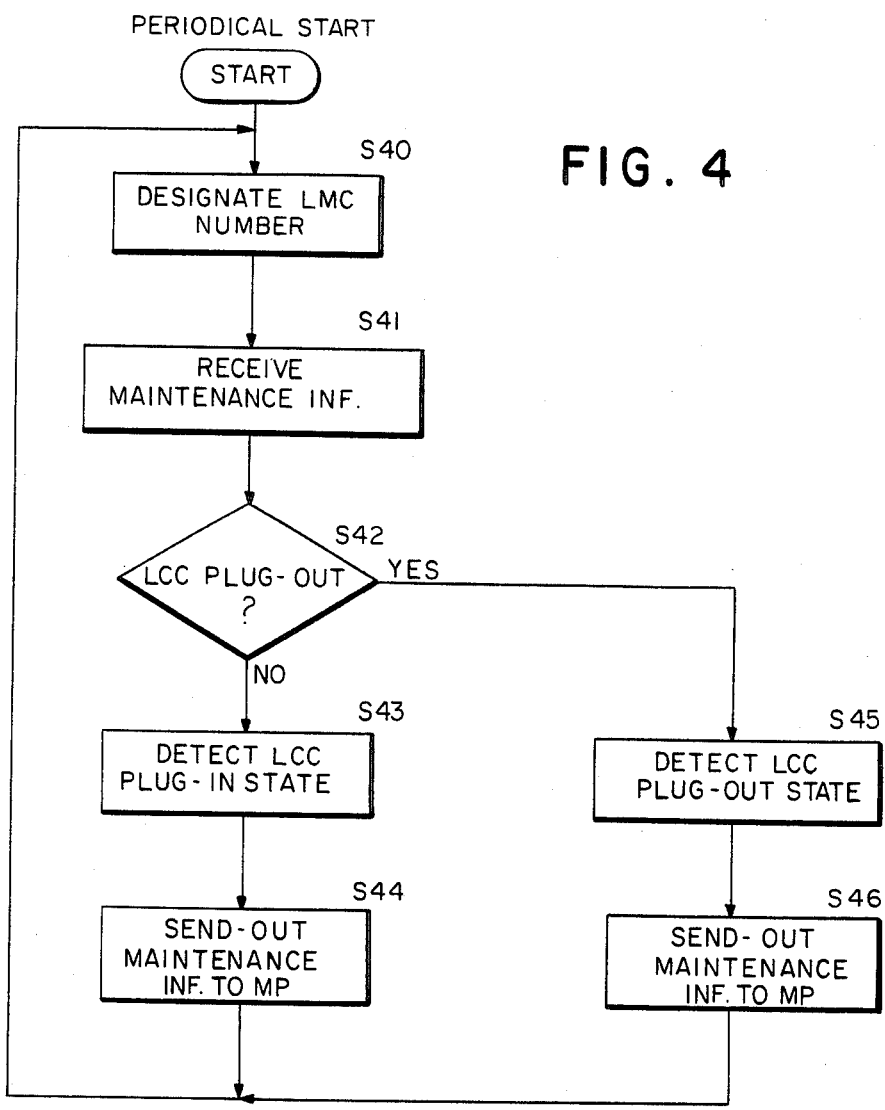
Figure 5:
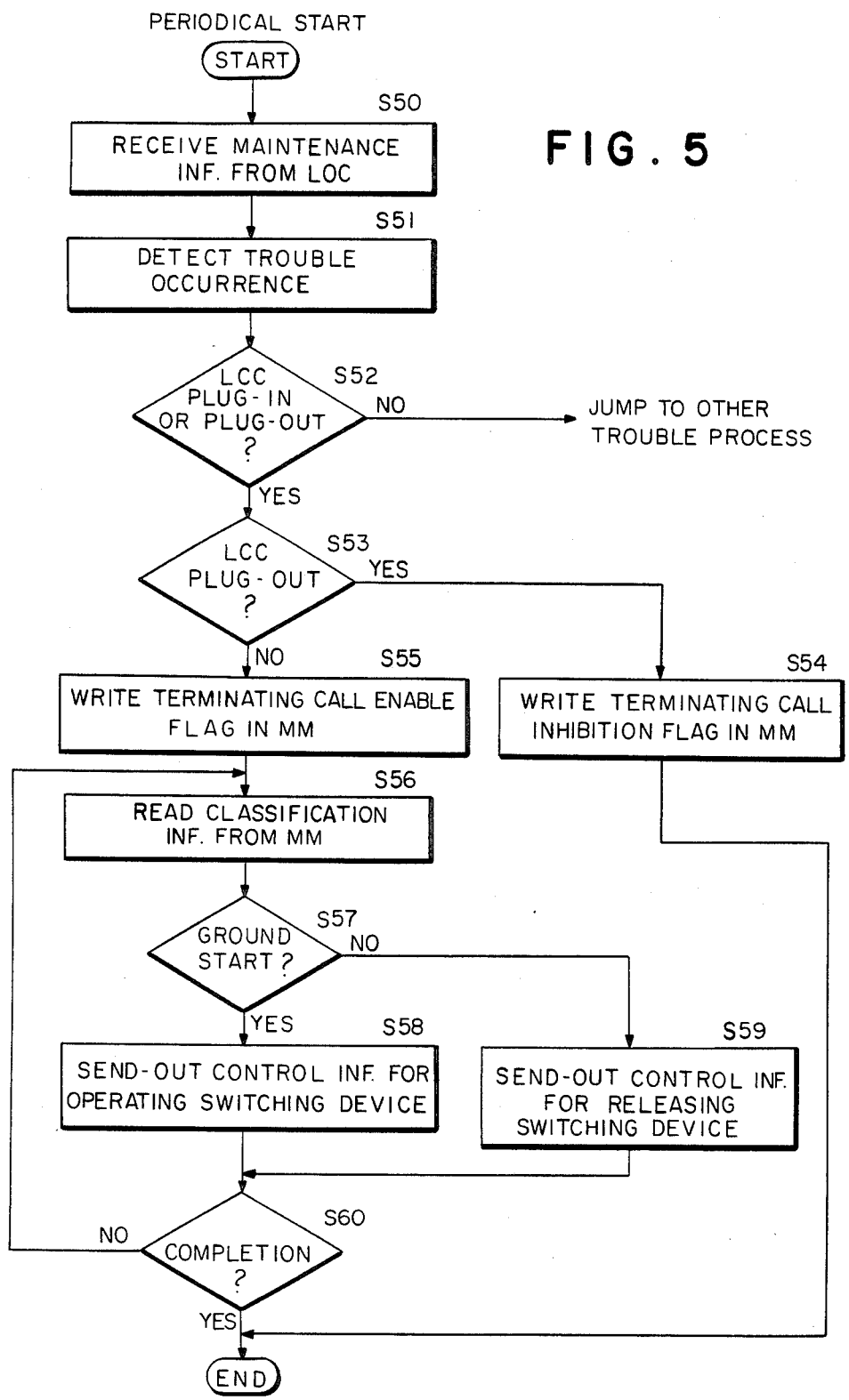

More particularly, as shown in FIG. 2, the subscriber data table 81 of the main memory circuit 80 is structured to designate predetermined memory regions with accommodation location information ELa, ELm, ELn and ELx of the terminal devices 10, 11, 12 and 13. Each of the memory regions has been inputted with start-signal type information "G(ground start)/LP(loop start)", dialing signal type information "DP(dial pulse)/PB(push button)", and terminal number information "TN" as the type information for the terminal devices 10, 11, 12 and 13 from the input-output equipment 90. When the LCa 50, LCm 51, LCn 52 and LCx 53 are initially set for the start-signal receive function, the processor 60 searches the data table 81 of the main memory circuit 80 based upon the accommodation location information ELa, ELm, ELn or ELx to obtain the accommodation location information ELa, ELm, ELn or ELx corresponding to the memory region where the start-signal type information "G" is stored. In this embodiment, since the terminal device 10 starts, or seizes, the LCa 50 with the ground-start signal, the processor 60 reads out the start-signal type information "G" from the memory region 82 of the data table 81 corresponding to the accommodation location ELa, which is included in the location ELA on the system which accommodates the terminal device 10. By this operation, the processor 60 sends out the control information for controlling the setting of the start-signal receive function in the LCa 50 in order to drive the switching device 501 of the LCa 50 and set the contacts S1 and S2 at a state illustrated with dotted lines in FIG. 1. The control information is received by the microprocessor 33 of the LOC 30 via the SNC 70. The microprocessor 33 recognizes the LMC 20 which controls the LCa 50 on the basis of the switching device number included in the information. The microprocessor 25 of the LMC 20 which has received the control information from the microprocessor 33 of the LOC 30 via the information transmission line 200, the converter 29 and the internal bus 26 recognizes the LCa 50 with the switching device number and then inputs the control information at the distributor 22. The control information at the distributor 22 is transmitted to the control circuit 500 of the LCC 54 when the gate signal given from the timing circuit 24 is the timing for the information transmission line 100. The control circuit 500 recognizs the order to drive the switching device 501 of the LCa 50 with the control information and transmits a driving signal to the signal line E1. By this operation, the switching device 501 of the LCa 50 is activated to switch the contacts S1 and S2 to the state shown with dotted lines. As a result the LCa 50 is set with a function for receiving the ground-start signal from the terminal device 10 via the communication line A1 when the terminal device 10 originates a call. In a manner similar to the above, the processor 60 searches the data table 81 of the main memory circuit 80 and sequentially controls the driving of the switching device of the line circuit connected to the terminal device corresponding to the accommodation location information which stores the start-signal type information "G". This thereby enables the appropriate initial setting of the start-signal receive function for the actual use state without any manual operation by maintenance workers. Since the line circuit LCm 51 is structured to receive the loop-start signal with the contacts S1 and S2 of the switching device maintained as shown in FIG. 1, it does not require the initial setting. Nevertheless, if the initial setting is desired, the processor 60 reads out the start-signal type information "LP" from the data table 81 of the main memory circuit 80 and sends out to the LOC 30 the control information to release the corresponding switching device of the line circuit.

The above-mentioned description relates to the processing for the initial setting of the start-signal receive function at the line circuits which is performed in the initial period of construction before the opening of the communication station. Similar processing may be necessary for the following cases: (1) a new terminal device is to be included, (2) the start signal from the existing terminal device should be changed and (3) a terminal device having a different type of a start signal is to be accommodated at the location which has already been used. When it becomes necessary to add a new terminal device or to transfer an existing one, if the communication system is to provide communication services to these terminal devices, it is only necessary to store the type information from the input-output equipment 90 in the data table 81 of the main memory circuit 80. In all of the cases (1), (2) and (3) mentioned above, the start-signal receive function can be easily set by effectively utilizing the data table 81 to achieve the similar effect.

When a new terminal device is to be added or the existing terminal device is to be transferred, the plug-in and plug-out states of the LCC's may be changed. The LMC 20 periodically monitors such a change in the LCC's which are under the control of the LMC 20. In the LMC 20 the microprocessor 25 is started with a periodical start program and inputs the state-monitor-control information of the LCCs under the control of the LMC 20 to the distributor 22 via the internal bus 26. The control information at the distributor 22 is transmitted to any of the information transmission lines 100 and 101 with the timing synchronized by the gate signal given from the timing circuit 24. For instance, when the LCC 54 is designated by the control information (Step S30), the information is received by the control circuit 500 of the LCC 54. If the LCC 54 is plugged in, the plug-in state information included in the maintenance information from the control circuit 500 is received by the microprocessor 25 via the multiplexer 23 of the LMC 20. If it is "plugged out", the maintenance information is not returned to the multiplexer 23 and the microprocessor 25 detects the plug-out state of the LCC 54. The microprocessor 25 indexes the LCC control table of the memory circuit 27 with the LCC number, reads out the state information stored at the corresponding memory region as the maintenance information of the preceding time, and compares the preceding maintenance information with the current maintenance information. If they are identical, the microprocessor 25 inputs the control information for monitoring the plug-in and plug-out states of the next LCC to the distributor 22. If the microprocessor 25 recognizes from the result of such comparison that the LCC which has been plugged in at the preceding time is now "plugged out" (steps S31 and S32), it detects the occurrence of the plug-out state of the LCC (step S33), writes the plug-out state information at a predetermined location of the control table (step S34), prepares the maintenance information to report it to the higher order LOC 30 and temporarily stores the maintenance information at the memory circuit 27 (step S35). When the microprocessor 25 recognizes in the result of such comparison that the LCC which has been "plugged out" at the preceding time is now plugged in (steps S31 and S36), it detects recovery of the LCC (step S37), writes in the plug-in state information at a predetermined location of the control table (step S38), prepares the maintenance information to report it to the LOC 30 and temporarily stores the maintenance information at the memory circuit 27 (step S39). The LMC 20 automatically and periodically monitors the plug-in and plug-out states of the LCC's under the control of the LMC 20. If a change occurs, the LMC 20 prepares the maintenance information for the LOC 30 and waits for the opportunity to report it.

The microprocessor 33 of the LOC 30 which is the controller of a higher order than the LMC 20 is started with a periodical start program in order to control the LCC's 54 and 55 via the LMC 20. The microprocessor 33 sequentially designates the LMC's (step S40) and receives the maintenance information of the plug-in and plug-out states of the LCC's which is prepared by the LMC's (step S41). With the information received, the microprocessor 33 recognizes the plug-in and plug-out states of the LCC's (steps S42, S43 and S45), prepares the maintenance information to report to the higher order processor 60 and immediately transmits the maintenance information (steps S44 and S46).

The processor 60 which is started by a periodical start program to receive the report from the LOC 30 via the SNC 70 discriminates whether or not any failure occurred on the controlled equipment on the basis of the content of the received maintenance information (steps S50 and S51). If the processor 60 recognizes an occurrence of a failure, it discriminates whether or not the content concerns the change in the plug-in or plug-out state of the LCC (step S52). In order to inhibit a terminating call to the line circuit which is recognized to be in the plug-out state, the processor 60 writes a terminating call inhibition flag at a location corresponding to the line memory table of the main memory circuit 80 (steps S53 and S54). When the LCC is plugged in, the processor 60 writes a terminating call enabling flag on the line memory table of the main memory circuit 80 to enable the line circuit for receiving the terminating call (steps S53 and S55). Then the processor 60 reads out the type information on the terminal device from the subscriber data table 81 of the main memory circuit 80 in order to start the service to the terminal device connected to the line circuit of the LCC (step S56). The processor 60 discriminates, on the basis of the type information, whether the line circuit is started with the ground-start signal or with the loop-start signal from the terminal device (step S57). If it is the line circuit of the ground start, the processor 60 transmits the control information to the LOC 30 via the SNC 70 in order to operate the switching device (step S58). If it is the line circuit of the loop start, on the other hand, the processor 60 transmits the control information to release the switching device to the LOC 30 via the SNC 70 (step S59). The processor 60 sequentially conducts the above mentioned processings to all of the line circuits within the LCC which have been changed in the plug-in state (step S60).

In the communication system of this embodiment according to the invention, when a power supply failure occurs at the LMC 20 and the LCa 50, LCm 51, LCn 52 and LCx 53, the LOC 30 of the order higher than the LMC 20 will detect such a failure to report to the processor 60. The LOC 30 periodically transmits pilot signals of a predetermined pattern to the LMC 20 and monitors whether or not the signals are normally returned. When such a power supply failure is recovered, the processor 60 sets anew the switching devices of all of the line circuits in the corresponding LCC on the basis of the content of the subscriber data table 81. This guarantees the operation of the line circuits after the recovery of the power supply failure.

Other alternatives and modifications to the abovementioned embodiment can be made within the scope of the invention defined by the appended claims.

What is claimed is:

1. A communication system with remotely controllable signal receiving means comprising:
   first means having a receive function responsive to a start-signal from a terminal device connected thereto via a communication line, said first means arranged at one of a plug-in or plug-out states wherein said first means is connected to the terminal device in the plug-in state and is not connected to the terminal device in the plug-out state;
   second means storing start-signal type information of the terminal device in a manner indexable with accommodation location information of the terminal device;
   third means for independently monitoring the plug-in and plug-out states of said first means and detecting a change in the states; and
   fourth means for controlling an initial setting of the receive function of said first means on the basis of the start-signal type information stored in said second means, said fourth means further being responsive to the change in the states of said first means detected by said third means wherein communication service to said first means in the plug-out state is inhibited and wherein the receive function of said first means is reset when said first means is changed into the plug-in state.

2. A communication system as in claim 1, wherein said start-signal type information is one of a first and second type wherein said first type indicates a closed-loop start signal and said second type indicates a ground-start signal.

3. A communication system as in claim 2, wherein said first means further includes:

means for receiving the start-signal type information; and means for switching the connection of the first means to the terminal device according to the first and second type of start-signal type information.

4. A communication system as in claim 1, further including means for changing the start-signal type information stored in said second means.

5. A communication system as in claim 1, wherein said third means further includes means for storing indications of the plug-in and plug-out states.

* * * * *